United States Patent [19]

Ghest et al.

[11] 4,153,938
[45] May 8, 1979

[54] HIGH SPEED COMBINATORIAL DIGITAL MULTIPLIER

[75] Inventors: Robert C. Ghest, Saratoga; Hua-Thye Chua, Cupertino; John M. Birkner, Santa Clara, all of Calif.

[73] Assignee: Monolithic Memories Inc., Sunnyvale, Calif.

[21] Appl. No.: 825,648

[22] Filed: Aug. 18, 1977

[51] Int. Cl.² ............................................. G06F 7/52
[52] U.S. Cl. .................................... 364/760; 364/757
[58] Field of Search ................ 364/760, 759, 758, 757

[56] References Cited

U.S. PATENT DOCUMENTS

| | | | |
|---|---|---|---|
| 3,372,269 | 3/1968 | MacSorley et al. | 364/760 |
| 3,730,425 | 5/1973 | Kindell et al. | 364/760 |
| 3,947,670 | 3/1976 | Irwin et al. | 364/758 |
| 4,041,292 | 8/1977 | Kindell | 364/760 |

Primary Examiner—David H. Malzahn
Attorney, Agent, or Firm—Harry M. Weiss

[57] ABSTRACT

This disclosure relates to a high speed combinatorial 8 by 8 digital multiplier suitable for implementation on a single semiconductor chip including an encoder for implementing the Modified Booth Algorithm to encode the eight multiplier digits. The encoder includes five subsections which generate a plurality of control signals. Each of the plurality of control signals is inputted into a separate one of five multiplexor circuits each of which also receives inputs representative of eight multiplicand bits in accordance with implementation of the Modified Booth Algorithm. Each of the five multiplexer circuits provides a plurality of outputs, each of the pluralities of outputs representing a separate partial product of the multiplier and multiplicand inputs. The partial products are inputted to an array of carry-save adders. The final stage of the adder network includes a carry-look-ahead adder which produces sixteen outputs which represent the product of the multiplier and the multiplicand. The multiplier includes circuitry for permitting encoding of the multiplier inputs in either binary unsigned or in two's compliment form. A multiplier mode control input controls whether the multiplier inputs are operated upon as two's compliment or as unsigned binary numbers. Similarly, a mode control input to circuitry which generates the multiplexer inputs representative of the multiplicand also controls whether the multiplicand inputs are operated upon as two's compliment numbers or as unsigned binary numbers. The mode of the multiplier inputs and multiplicand inputs can be independently controlled, so that mixed signed and unsigned representations of the multiplier and multiplicand, respectively, can be utilized.

21 Claims, 14 Drawing Figures

FIG. 1
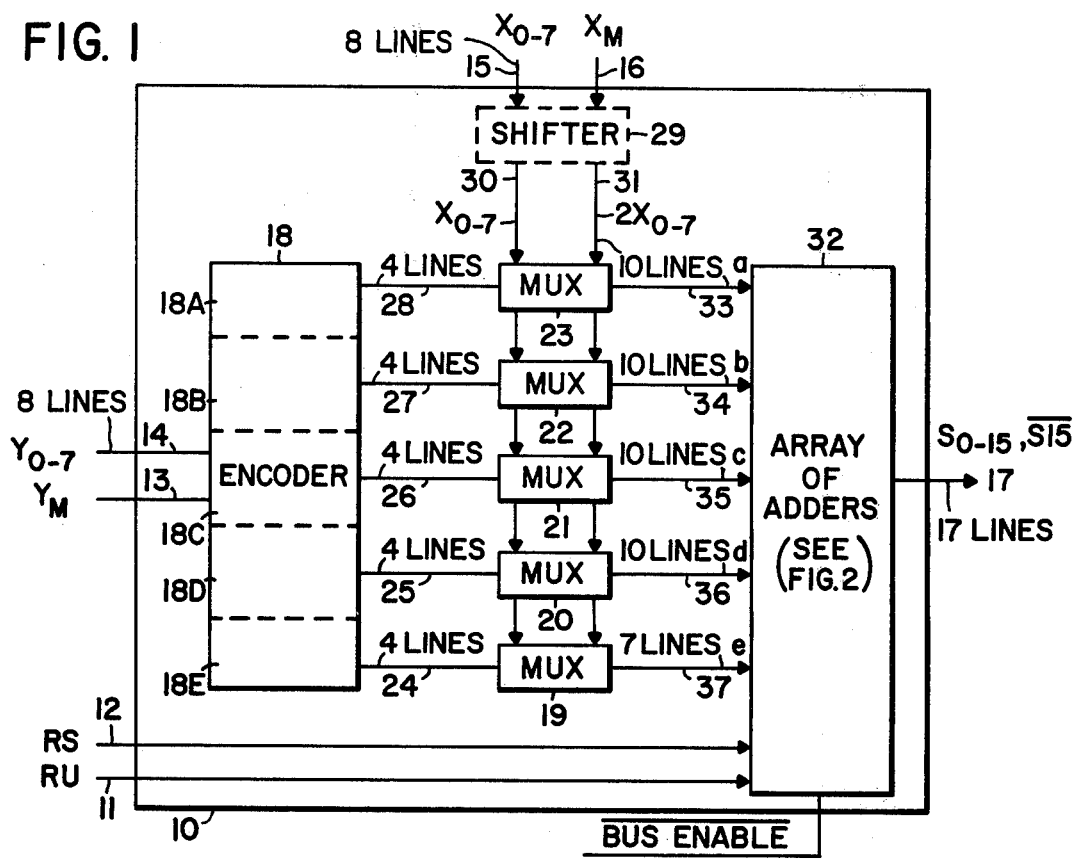
FIG. 12
| FIG. 3 | FIG. 4 | FIG. 5 |
|---|---|---|
| FIG. 6 | FIG. 7 | FIG. 8 |
| FIG. 9 | FIG. 10 | FIG. 11 |
FIG. 13
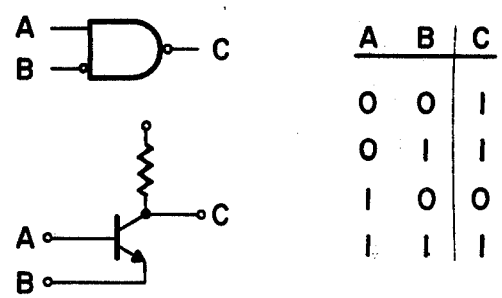
FIG. 14
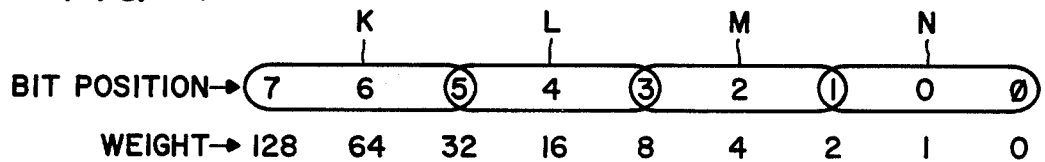

HIGH SPEED COMBINATORIAL DIGITAL MULTIPLIER

BACKGROUND OF THE INVENTION

1. Field of the Invention

The invention relates generally to digital multipliers and, more particularly, to high speed combinatorial digital multipliers.

2. Brief Description of the Prior Art

High speed digital multipliers find application in digital signal processing in many applications, such as in real time processing of air traffic monitoring equipment, for example, wherein the controller needs to see planes on his screen immediately. Digital multipliers are also utilized in other digital signal processors, such as radar and sonar. In many applications, processing of analog signals in digital form in real time would not be practical without high speed digital multipliers. Other applications include fast Fourier transform processors and high speed floating point arithmetic logic units. The technology is such that a large number of power dissipating elements is required to implement a digital multiplier having an eight bit multiplier input and an eight bit multiplicand input, yet capable of operating at high speeds, such as 200 nanoseconds or less for a complete 8-by-8 multiplication. Prior art 8-by-8 multipliers required either several semiconductor chips, or if the entire multiplier were implemented on a single chip, excessively high power dissipation, thereby requiring forced air cooling. A strong need exists in the industry for an eight-by-eight digital multiplier which can be implemented on a single integrated circuit chip and housed in a conventional semiconductor package and yet dissipating only approximately one watt of power, and capable of operating at a speed of approximately 100 nanoseconds.

SUMMARY OF THE INVENTION

An object of the invention is to implement a high speed digital multiplier at least eight bits by eight bits in a single semiconductor package and requiring no forced air cooling.

Another object of the invention is to provide a digital multiplier having reduced power dissipation yet having high operating speed.

Still another object of the invention is to provide a digital multiplier which is easily expandable.

A further object of the invention is to provide a digital multiplier having mode control over the format of the multiplier inputs and multiplicand inputs.

Another object of the invention is to provide a digital multiplier having external control over the rounding of the product outputs, depending upon whether they are in signed or unsigned format.

Still another object of the invention is to provide a high speed low power dissipation digital multiplier utilizing circuitry which generates a reduced number of partial products.

Briefly described, the invention is a digital multiplier which includes partial product generating circuitry for producing a plurality of partial products from the multiplier inputs and the multiplicand inputs and including mode control circuitry responsive to a control input which controllably causes the multiplier or multiplicand inputs to be operated upon as signed or unsigned binary numbers. In one embodiment of the invention, the mode of the multiplier inputs can be controlled independently of the mode of the multiplicand inputs. An adder circuit receives the partial product outputs from the partial product generating circuitry and adds the partial products to produce plurality of product outputs.

In another embodiment of the invention, the partial product generating circuitry includes an encoder which encodes the multiplier inputs according the the known Modified Booth Algorithm to produce a plurality of control signals. The partial product generating circuitry also includes a plurality of multiplexer circuits which receives the control signals as inputs, and also receives as other inputs a plurality of signals representive of the multiplicand inputs in a format consistent with the Modified Booth Algorithm. The multiplexer circuits produce as outputs a plurality of partial products less than the number of partial products which would be obtained if ordinary multiplication techniques are implemented. The adder circuitry includes an array of carry-save adders arranged like a known Wallace Tree, followed by a carry-look-ahead adder which produces as its output a plurality of product outputs.

In still another embodiment of the invention, the adder circuitry responsive to an input which controls rounding of the product outputs. One rounding input is used to round a signed product, the other input is used to round an unsigned product.

The foregoing and other objects, features and advantages of the invention will be apparent from the following, more particular description of the preferred embodiments of the invention, as illustrated in the accompanying drawings.

BRIEF DESCRIPTION OF THE DRAWINGS

FIG. 1 is a block diagram of a digital multiplier according to the invention.

FIG. 12 is a diagram illustrating how FIGS. 3–11 may be fitted together to provide a complete logic diagram of the digital multiplier of FIG. 1.

FIG. 13 is a diagram illustrating a gating circuit technique utilized in implementing the digital multiplier according to the invention.

FIG. 14 is useful in describing the application of the Modified Booth Algorithm according to the invention.

DETAILED DESCRIPTION OF THE INVENTION

Figure 2:
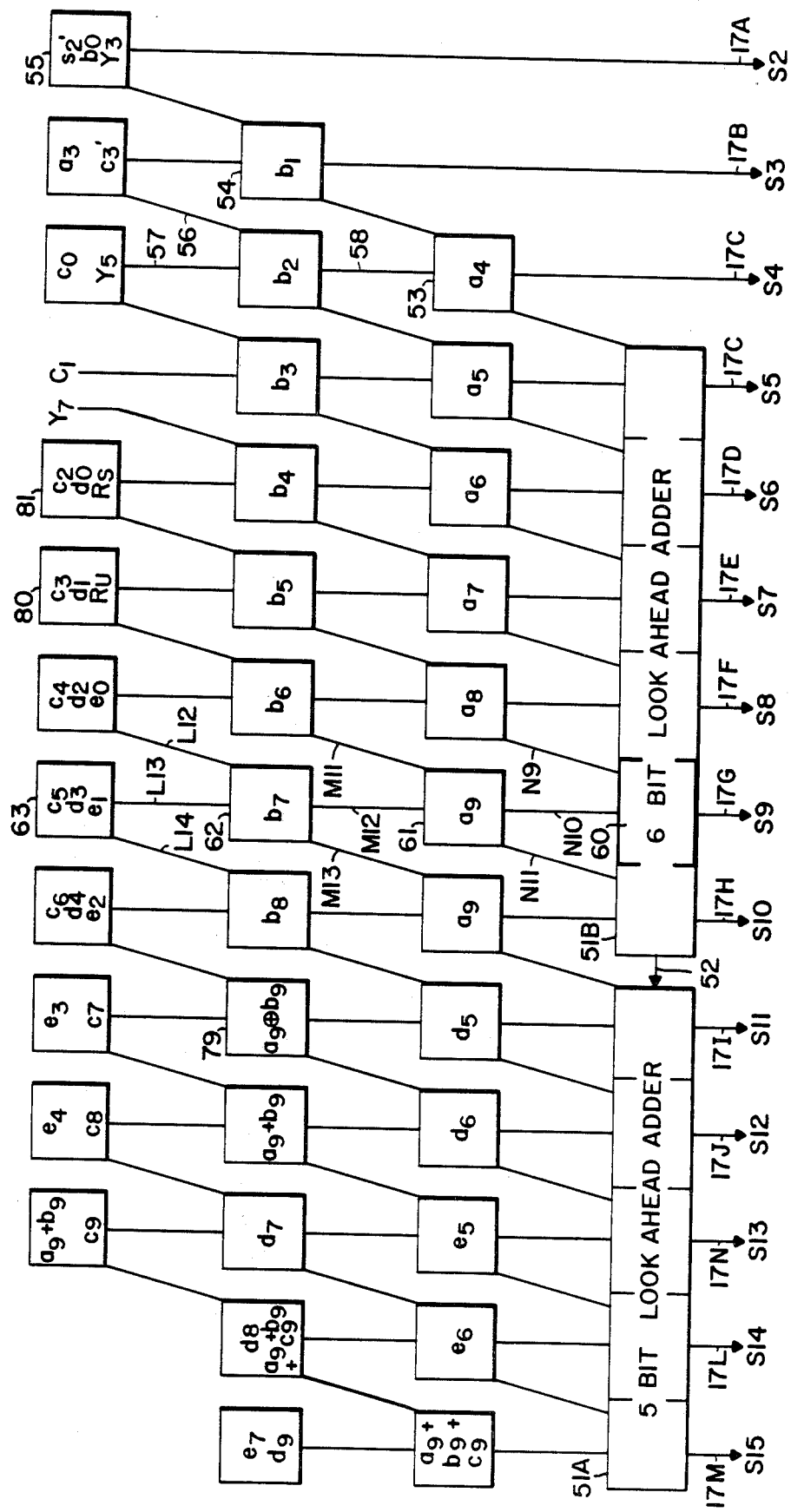
FIG. 2 is a block diagram of the adder array according to FIG. 1.

Referring to FIG. 1, the digital multiplier 10 which is illustrated in the block diagram thereof is a high speed eight-bit by eight-bit combinatorial multiplier which has the capability of multiplying two eight-bit unsigned or signed (two's compliment) numbers, and is implemented on a single semiconductor chip. The digital multiplier generates a 16-bit signed or unsigned product. The eight-bit multiplicand input is represented by $X_0, X_1, X_2, X_3, X_4, X_5, X_6, X_7$, and the eight-bit multiplier input is represented by $Y_0, Y_1, Y_2, Y_3, Y_4, Y_5, Y_6, Y_7$. The 16-bit product output is represented by $S_0, S_1, \ldots S_{15}$. The multiplier $Y_{0-7}$ and the multiplicand $X_{0-7}$ each have associated therewith a mode control line, $Y_M$ and $X_M$, respectively.

Referring to FIG. 1, digital multiplier 10 includes an encoder circuit 18 for implementing the Modified Booth Algorithm, which encoder circuit is broken down into five subsections, 18A, 18B, 18C, 18D, and 18E. The multiplier inputs $Y_0$–$Y_7$ of digital multiplier 10, designated generally by 14, serve as inputs to various ones of the subsections 18A–18E, as is more clearly evident from inspection of FIGS. 3–11. Multiplier Mode control conductor 13, designated $Y_M$, is also provided as an input to encoder circuit 18. Each of the encoder subsections 18A–18E provides four output select lines. Each group of four select lines for the corresponding encoder subsections 18A–18E is designated, respectively, by reference numerals 28, 27, 26, 25, and 24. The groups of encoder select line outputs are coupled, respectively, to multiplexer circuits 23, 22, 21, 20, and 19. Circuitry designated by reference numeral 29 includes complement generating circuitry and control circuitry responsive to the eight multiplicand inputs $X_{0-7}$ designated generally by 15. Mode control conductor 16 receives multiplicand mode control input $X_M$ and is shown in FIG. 1 as being coupled to circuitry 29. The output of circuitry 29 includes a group of ten conductors, designated by 30, which includes conductors representative of each of the eight multiplicand inputs $X_0$–$X_7$, and two sign extension bit. A group of ten conductors 31 includes signals represented by the signals $X_0$–$X_7$, as explained subsequently. In the implementation of the circuit of FIG. 1 as shown in FIGS. 3–11, the conductors 31 are actually interconnections of the same signals as conductors 30 connected to various ones of the multiplexers 19–23 in order to effect the multiplexing operation. Various ones of the conductors 30 and 31 are connected to various ones of the multiplexer circuits 19, 20, 21, 22, and 23, as is clearly set forth in FIGS. 3–11. Multiplexer 23 provides as outputs 10 conductors designated generally by 33. Similarly, multiplexers 22, 21, 20, and 19 provide plural output conductors 34, 35, 36, and 37; partial products designated as a, b, c, d, and e are produced on 5 groups of conductors 33, 34, 35, 36, and 37, respectively.

The partial products a, b, c, d and e are provided as inputs to dder array 32. Adder array 32 includes circuitry which receives rounding input RS applied to conductor 12 for signed rounding of product output $S_{0-15}$, and which receives input RU on conductor 11 for unsigned rounding of product output $S_{0-15}$.

Adder 32 of FIG. 1 is shown in more detail in FIG. 2. Array 32 of FIG. 2 includes a carry-look-ahead adder including elements 51A and 51B. 51A and 51B are actually separate carry-look-ahead adders because it is impractical to provide a single carry-look-ahead scheme for as many bits as S5 to S15. Conductor 52 conducts a carry-look-ahead signal from section 51B to 51A. The bit including 60, 61, 62 and 63, corresponding to $S_9$, for all four levels, or stages, of the adder array of FIG. 2 is also shown partly in FIG. 7 and partly in FIG. 8, and is enclosed therein by dotted lines designed by 60, 61, 62 and 63. The elements in FIG. 2 include a plurality of carry-save-adders; each of the square blocks in FIG. 2 represents a carry-save adder circuit. For example, blocks 53, 54, 55, 61, 62, and 63 are all individual carry-save adder blocks. An array of carry-save-adders as shown in FIG. 2 is generally connected up in a fashion similar to a Wallace Tree, and is utilized to avoid the excessively high power dissipation of utilizing only the carry-look-ahead circuitry ordinarily utilized with simple adder circuits. A carry-save adder is one which has three inputs and two outputs. The three inputs include two logic inputs for receiving logic signals to be added and a carry input. A carry-save-adder generates a sum bit and a carry bit as outputs. In the first stage the carry-save-adders are used to add three partial products simultaneously. The Wallace Tree type of adder interconnection not only saves power dissipating elements, but also reduces delay time due to carry propagate time.

The convention adopted herein in FIG. 2 is that the upper connections to each square (carry-save-adder) represent inputs thereof and the lower connections to each square represent outputs thereof. Also, the alphanumeric number within each square designates one or more inputs to that carry-save-adder bit. For example, referring to carry-save-adder bit 62, it has inputs L13 and L12 and B7 and has output M13 and M12. Carry-save-adder 63 has outputs L14 and L13 and inputs c5, d3, and e1. Carry-save-adder 79 has an input thereto which is a signal equal to the exclusive "OR" of a9 and b9. (Note that, for example, the partial product a can also be represented by $a_0 a_1 \ldots a_9$; b, c, d and e may be similarly represented).

It should be noted that rounding input RS, applied to conductor 12 in FIG. 1 is applied to carry-save-adder 81, while rounding input RU, applied to conductor 11 in FIG. 1, is applied to carry-save-adder 80.

FIGS. 3–11 represent a complete logic diagram for implementing the digital multiplier of FIGS. 1 and 2. Certain blocks of FIGS. 1 and 2 are identified with particularity in FIGS. 3–11.

Figure 3:
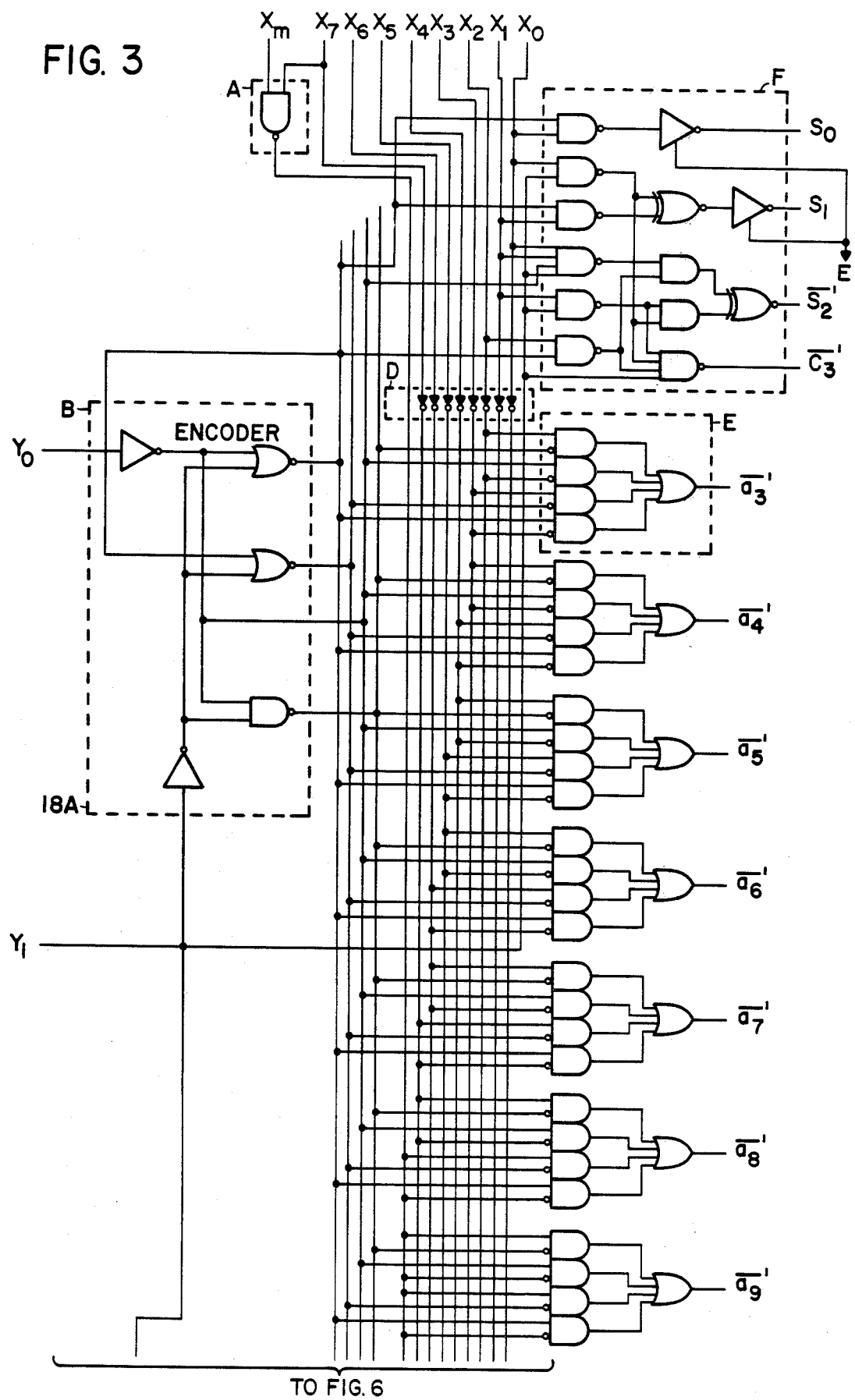
FIGS. 3–11, in combination, constitute a complete logic diagram implementing a presently preferred embodiment of the digital multiplier of FIGS. 1 and 2.
Figure 4:
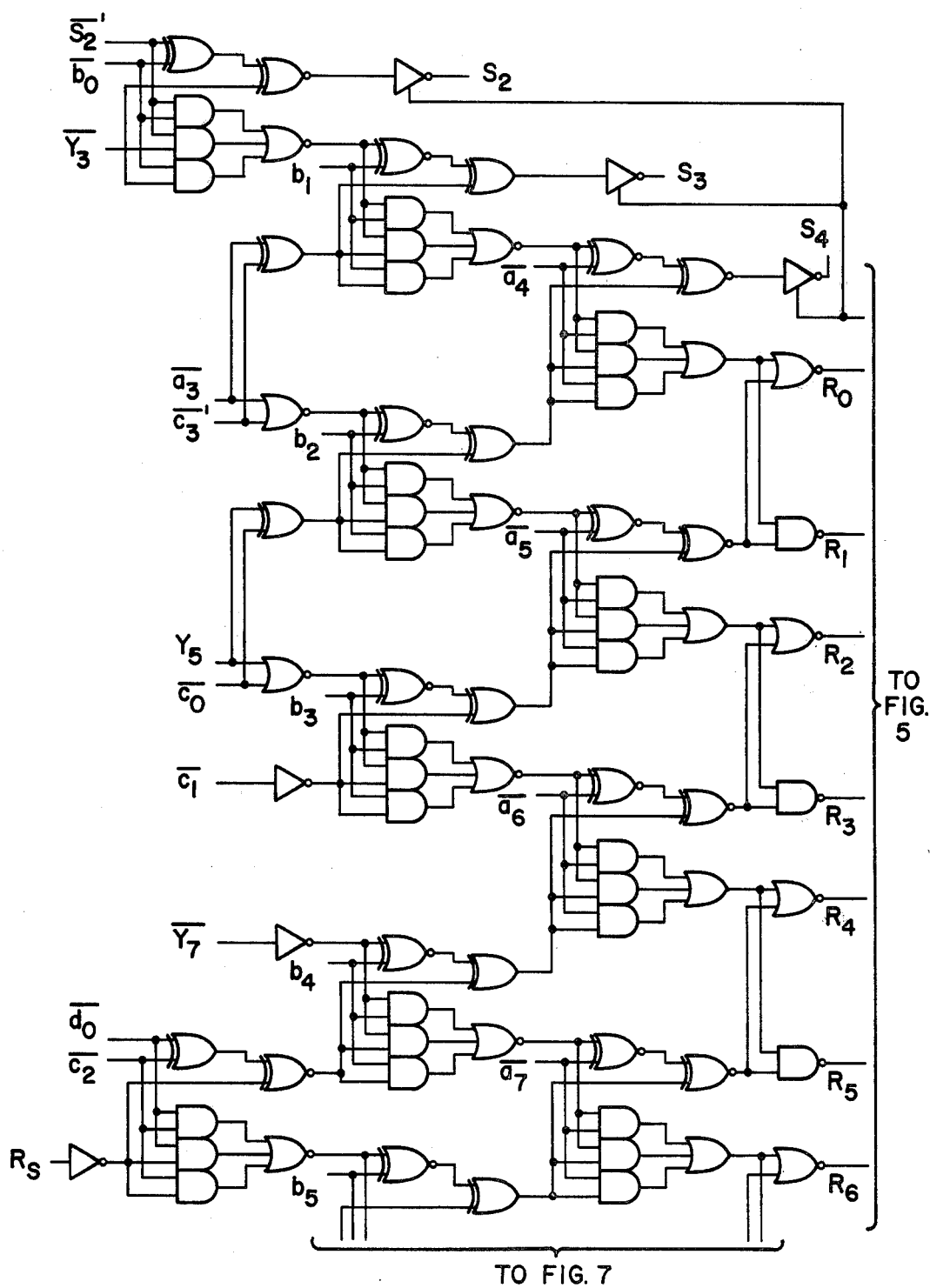
Figure 5:
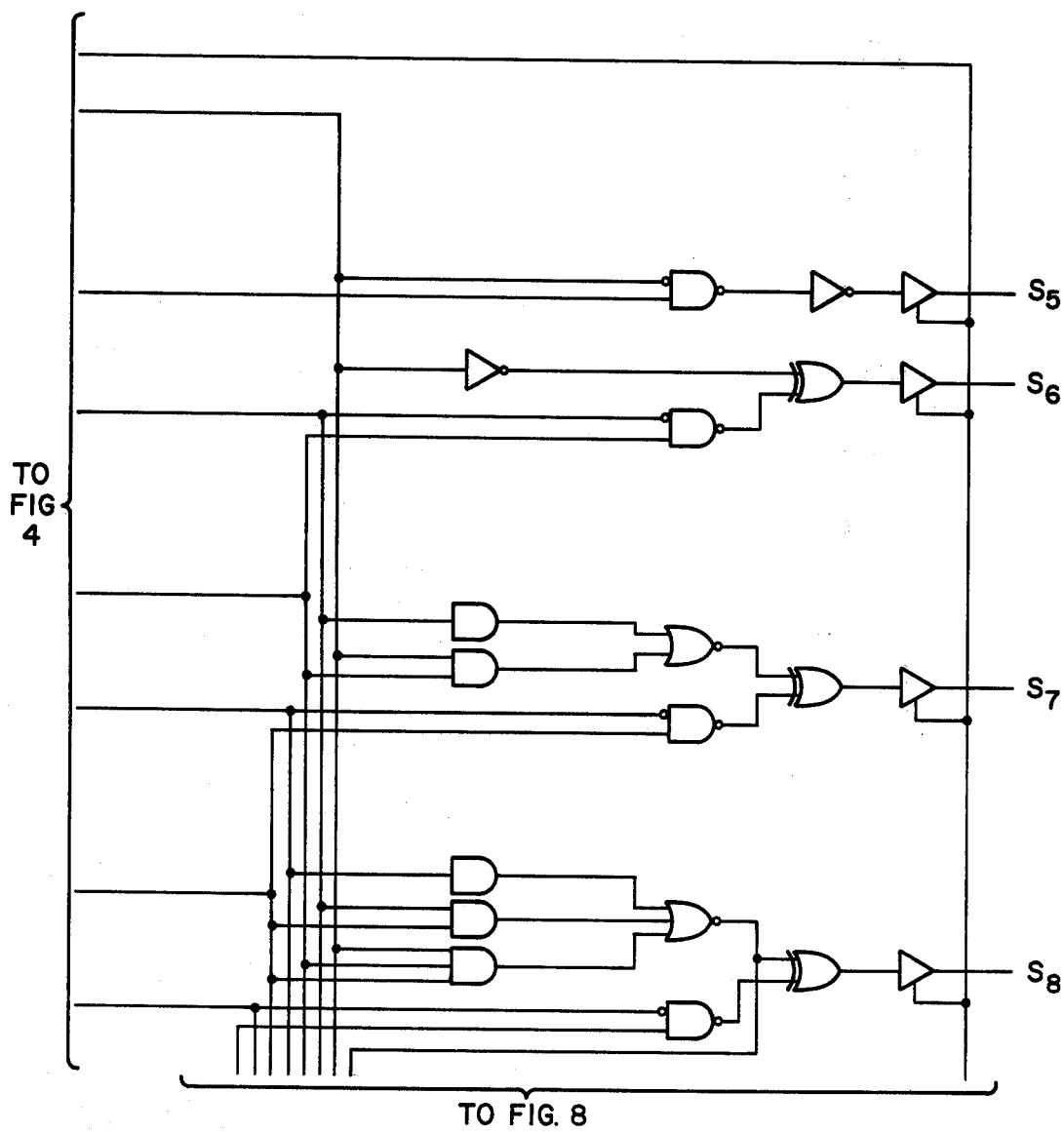
Figure 6:
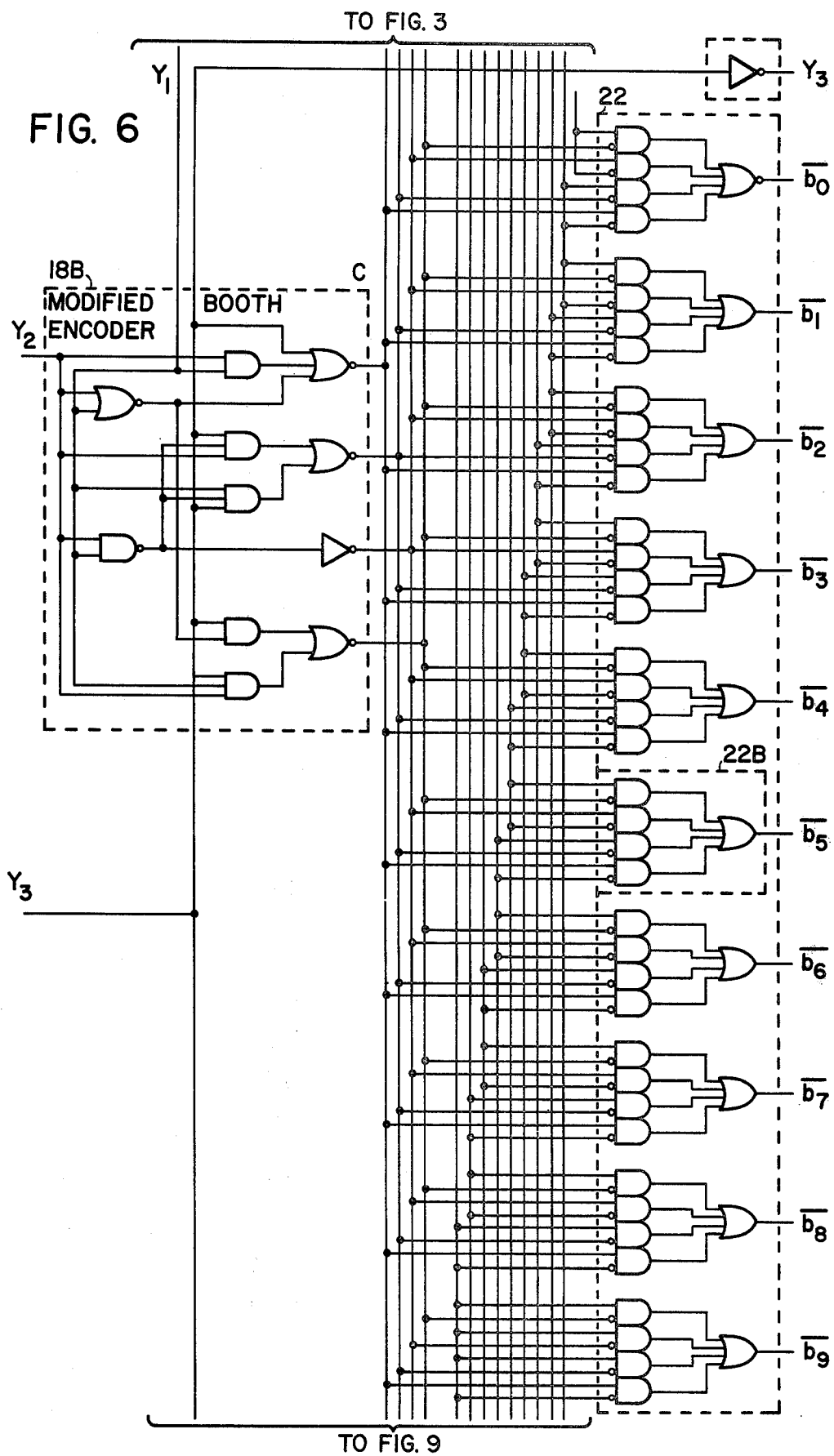
Figure 9:
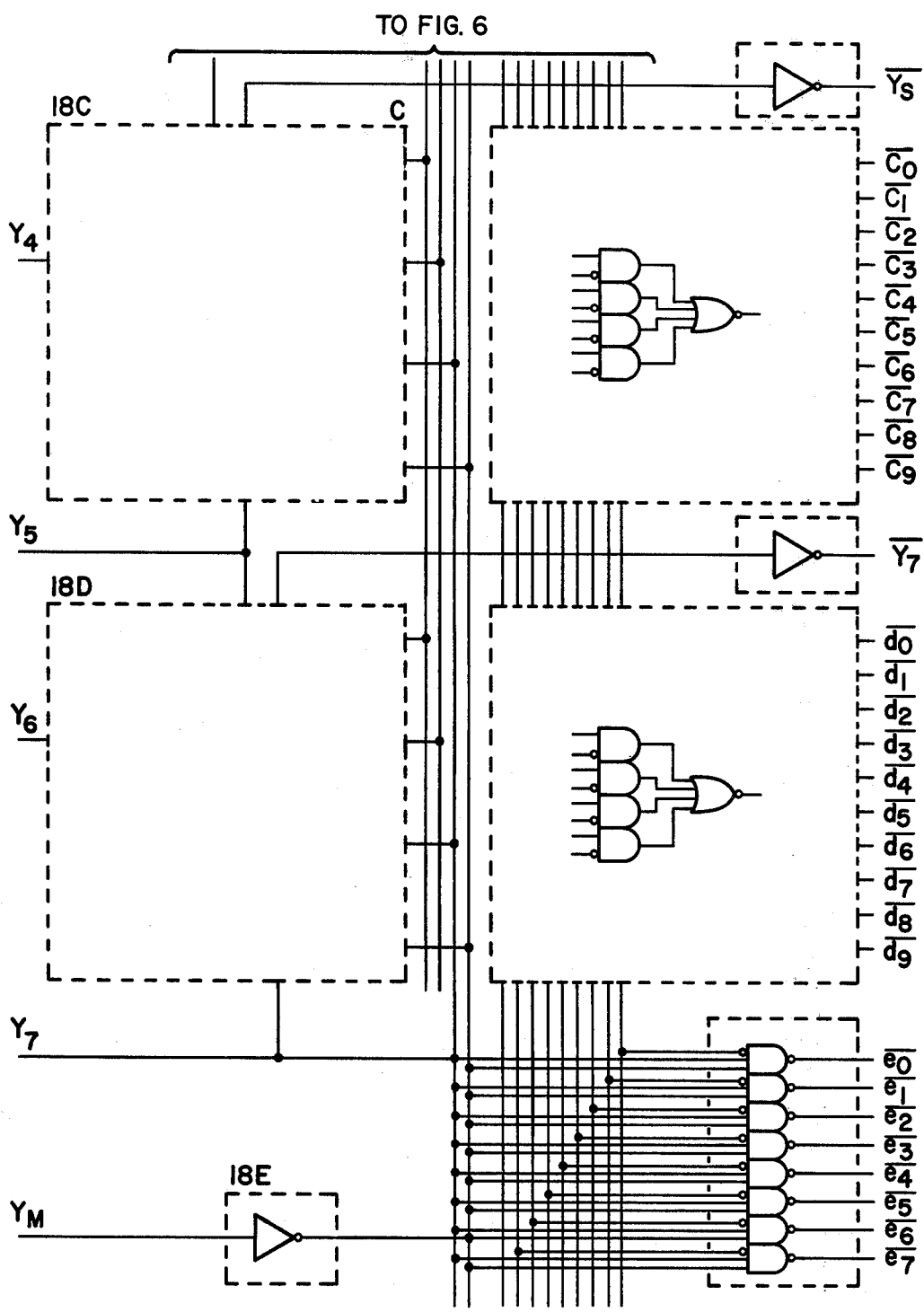
Figure 10:
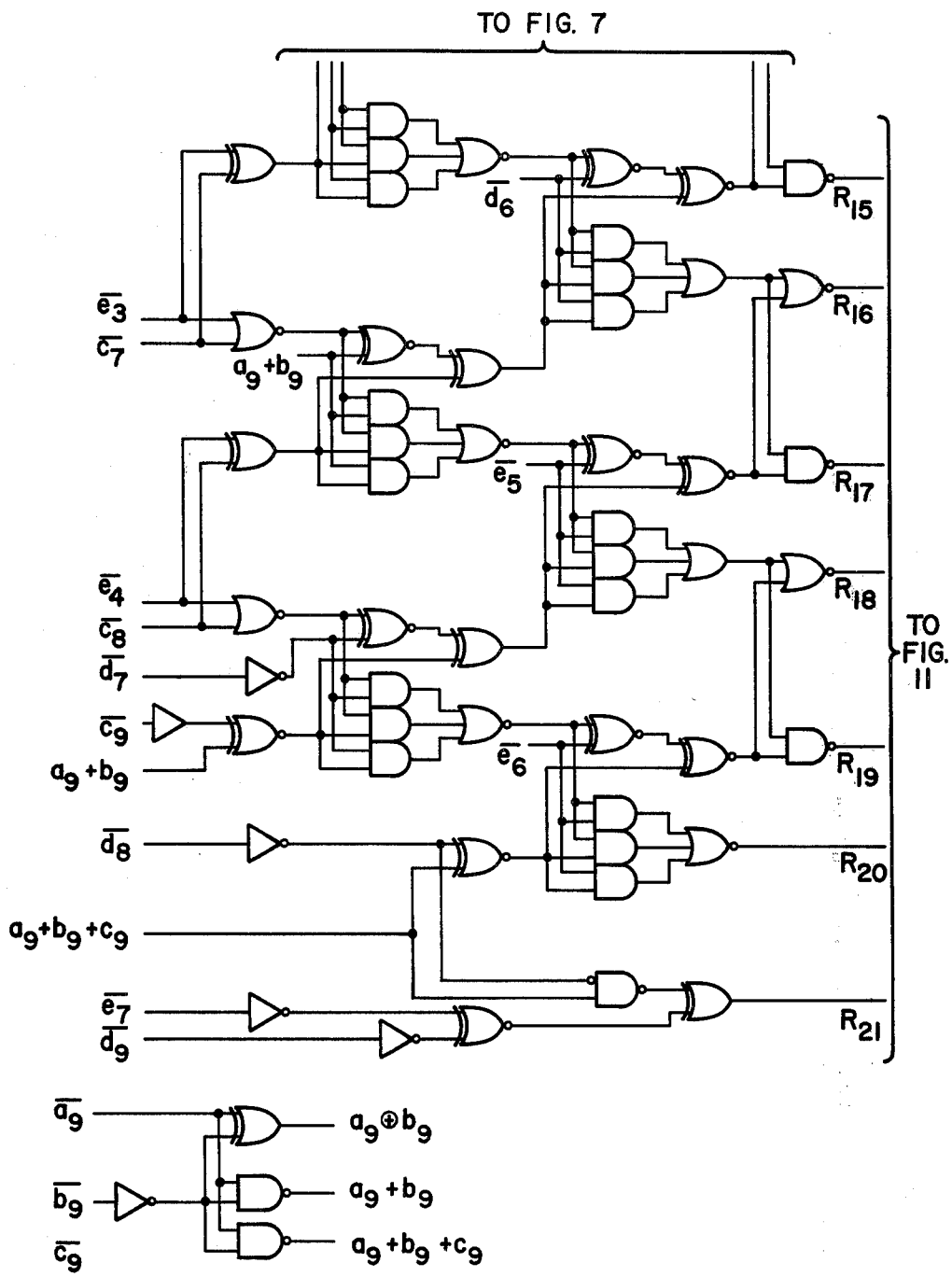
Figure 11:
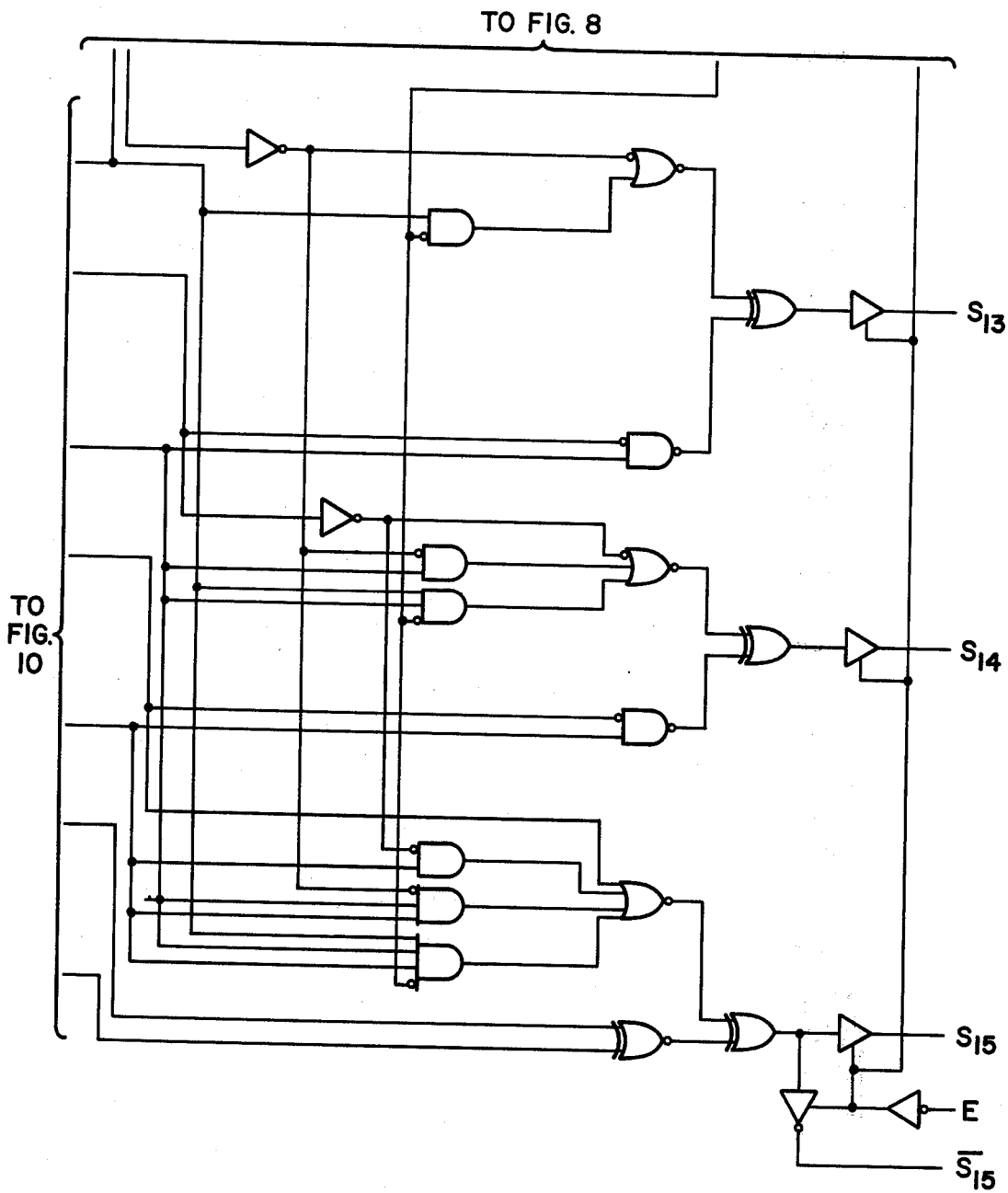

For example, encoder subsection 18A in FIG. 3, encoder subsection 18B in FIG. 6, encoder subsections 18C, 18D, and 18E in FIG. 9 correspond to the subsections encoder 18 of FIG. 1 having the same reference numerals. Multiplexer 22 of FIG. 1 is indicated by the same reference numeral 22, within the dotted line in FIG. 6. A single output bit of multiplexer 22 in FIG. 6 is indicated by reference numeral 22.

The inverters, AND gates, NOR gates, exclusive OR gates, etc., in FIGS. 3–11 can be readily implemented by those skilled in the art.

The logic gate shown in FIG. 13 having one input B with a small circle at the end of it is utilized throughout the multiplexer circuitry and other circuits in FIGS. 3–11. This circuit, although not practical for utilization in MSI circuits (medium scale integrated circuits), is practical in LSI (large scale integrated) circuits because it can be implemented utilizing a single NPN transistor and a resistor, as shown also in FIG. 13. The truth table for this gate element is shown in FIG. 13. The circuit of FIG. 13 requires very little semiconductor chip area and has the advantage that it is in the "off" or non power-dissipating condition for a much greater proportion of the time in the digital multiplier circuit as implemented in FIGS. 3—11 than would be the case if the logic equation ($\overline{C} = A \cdot \overline{B}$) were implemented by conventional logic gates.

Figure 7:
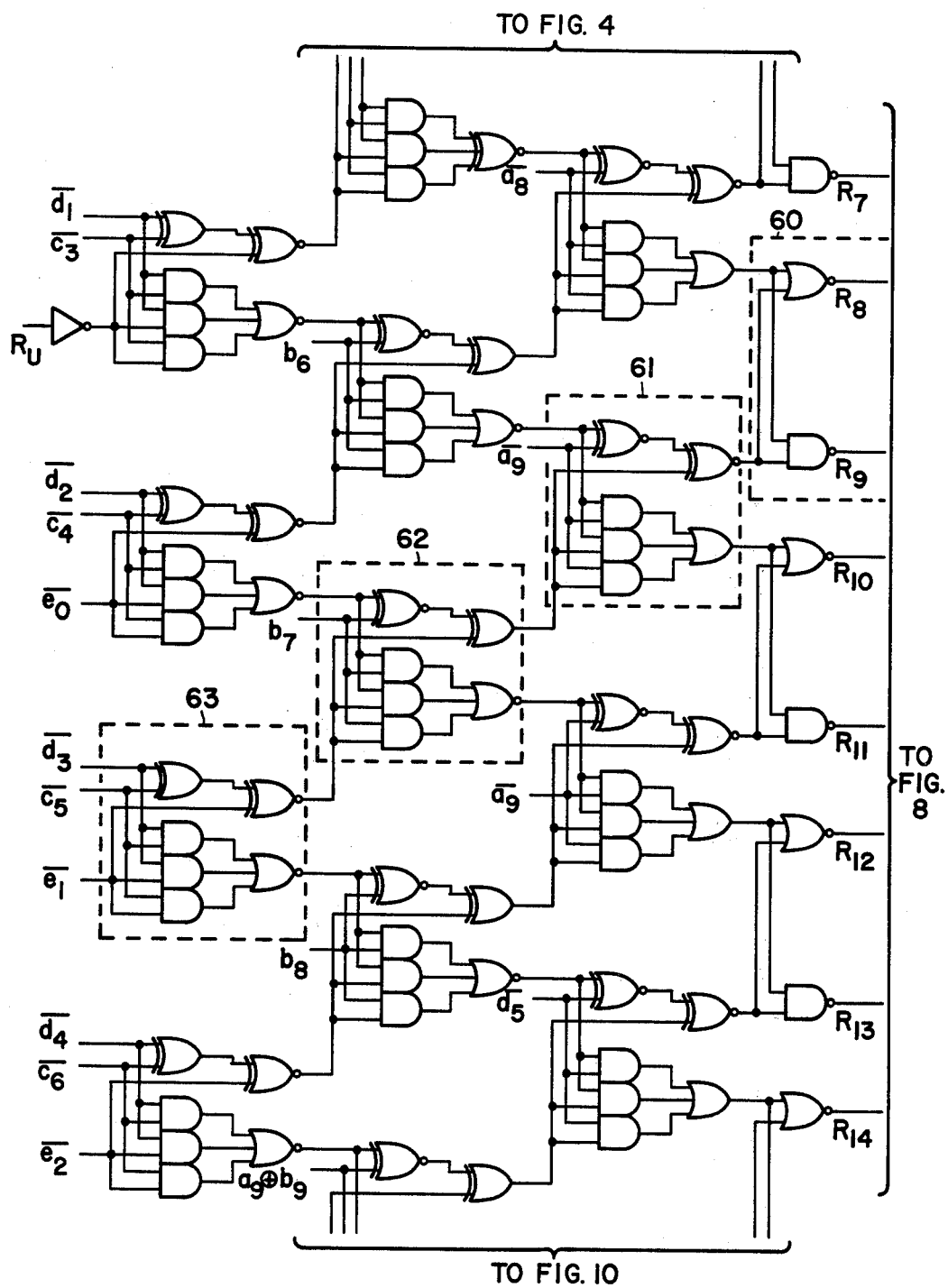
Figure 8:
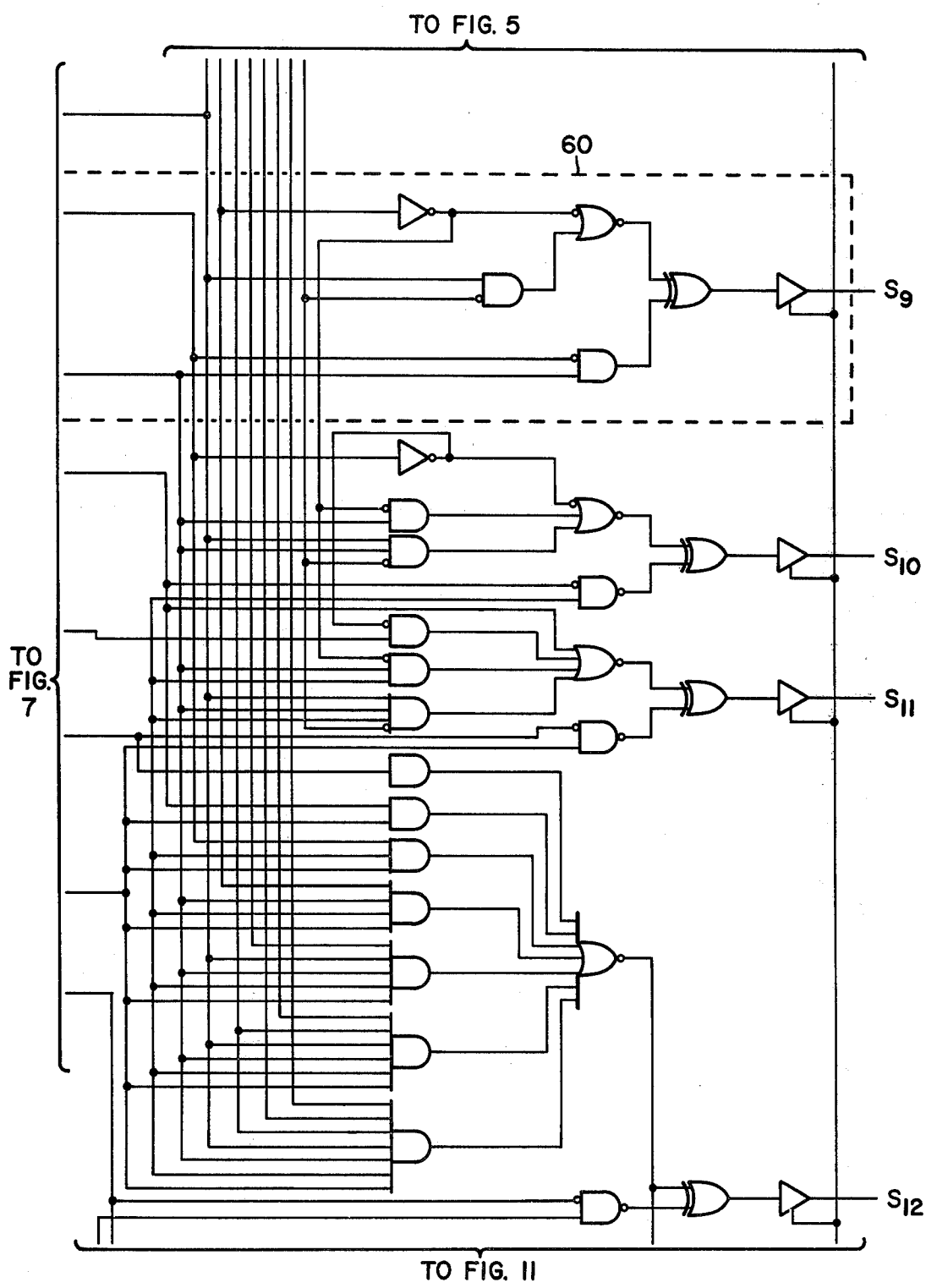

Referring to FIG. 7, typical carry-save adders are indicated by reference numerals 61, 62, and 63; these three adders correspond to carry-save adders 61, 62, and 63 in FIG. 2. A typical carry-look-ahead adder 60 of FIG. 2 is shown partly in FIG. 7 and partly in FIG. 8 and wherein it is also designated by reference numeral 60.

As mentioned earlier, the manner in which FIGS. 3–11 can be fitted together to provide a complete logic diagram for the digital multiplier of FIG. 1 is illustrated in FIG. 12.

The operation of digital multiplier 10 is such that when a mode control line ($Y_M$ or $X_M$) is at a low logic level, the operand (Y or X) is treated as an unsigned eight-bit binary number, while if the mode control input $X_M$ or $Y_M$ is at a high logic level, the operand correspondingly is treated as an eight-bit signed (two's complement) eight-bit binary number.

The two additional inputs RS and RU allow the addition of a bit within the multiplier array at appropriate bit positions to effect rounding of signed or unsigned fractional numbers. The most significant product bit $S_{15}$ is available in both "true" and "complement" form to assist in expansion of eight-by-eight digital multiplier 10 to obtain larger, i.e., 16-by-16 digital multipliers. The product outputs are of the three-state type, controlled by an active low output enable (see FIG. 11), which allows several digital multipliers 10 to be connected to a parallel bus or to be used in a "pipeline" system. A presently preferred embodiment of digital multiplier 10 utilizes a single +5 volt power supply, and is packaged in a standard 40-pin dual-in-line package, and is implemented using low power schottky TTL integrated circuit semi-conductor technology.

A conventional digital multiplication technique is shown in the following table, entitled Example 1.

subsequent gating stage. Assuming that shifting is done by hard-wired alignment (rather than by, for example, a shift register), it may readily be seen that it takes 64 gates to obtain the partial products, a, b, c, d, and e, f, g, h plus an additional 16 adder circuits to obtain the product $S_{0-15}$. Each of these elements dissipates a substantial amount of power.

In order to reduce the total amount of power dissipation, a digital multiplier may utilize an algorithm known as the "Modified Booth Algorithm". See the article, "A Proof of the Modified Booth's Algorithm for Multiplication", by Lewis B. Rubinfield on p. 1014 of the 1975 "IEEE Transactions on Computers," October 1975.

According to the invention, the number of partial products required to implement digital multiplication is greatly reduced by implementing the Modified Booth Algorithm in order to encode the multiplier inputs $Y_{0-7}$ to produce selection signals on outputs such as 27, 28 in FIG. 1. Also in accordance with the Modified Booth Algorithm, suitable representations of the multiplicand bits are selected and gated through the multiplexer circuits, such as 23, 22, etc., to provide a different set of partial products than the set shown in Example 1, above.

The following example, designated as Example 2

| X — | | | | | | | | $X_7$ | $X_6$ | $X_5$ | $X_4$ | $X_3$ | $X_2$ | $X_1$ | $X_0$ |
|---|---|---|---|---|---|---|---|---|---|---|---|---|---|---|---|
| Y — | | | | | | | | $Y_7$ | $Y_6$ | $Y_5$ | $Y_4$ | $Y_3$ | $Y_2$ | $Y_1$ | $Y_0$ |
| A — | | | | | | | | $A_7$ | $A_6$ | $A_5$ | $A_4$ | $A_3$ | $A_2$ | $A_1$ | $A_0$ |
| B — | | | | | | | $B_7$ | $B_6$ | $B_5$ | $B_4$ | $B_3$ | $B_2$ | $B_1$ | $B_0$ | |
| C — | | | | | | $C_7$ | $C_6$ | $C_5$ | $C_4$ | $C_3$ | $C_2$ | $C_1$ | $C_0$ | | |
| D — | | | | | $D_7$ | $D_6$ | $D_5$ | $D_4$ | $D_3$ | $D_2$ | $D_1$ | $D_0$ | | | |
| E — | | | | $E_7$ | $E_6$ | $E_5$ | $E_4$ | $E_3$ | $E_2$ | $E_1$ | $E_0$ | | | | |
| F — | | | $F_7$ | $F_6$ | $F_5$ | $F_4$ | $F_3$ | $F_2$ | $F_1$ | $F_0$ | | | | | |
| G — | | $G_7$ | $G_6$ | $G_5$ | $G_4$ | $G_3$ | $G_2$ | $G_1$ | $G_0$ | | | | | | |
| H — | $H_7$ | $H_6$ | $H_5$ | $H_4$ | $H_3$ | $H_2$ | $H_1$ | $H_0$ | | | | | | | |
| S — $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |

In Example 1, the eight-bit multiplicand X is multiplied by the eight-bit multiplier Y. The multiplication takes place in a well known fashion of multiplying each bit of X by Y to obtain a first partial product a, which is given the same weight as the weight of $Y_0$. Then, each bit of multiplicand X is multiplied by $Y_1$ to obtain partial product b, which is shifted to the left one bit in order to give it the same weight as is given to $Y_1$. Similarly, the other bits of multiplier Y are multiplied by each bit of multiplicand X to provide partial products c, d, e, f, g and h, all of which are given the appropriate weight by shifting each, respectively, to the left by one bit with respect to the preceding partial product. Eight partial products are thus obtained according to this method in order to multiply two eight-bit binary numbers. All of the partial products, when properly shifted or aligned, are added together to obtain a 16-bit product S (i.e., $S_{0-15}$).

For binary arithmetic, each of the multiplications by the bits Y0, Y1, etc., is easily accomplished by gating each bit of X with appropriate ones of the bits Y0, Y1, etc., depending on which of said multiplications is occurring. Shifting is also easily accomplished in binary arithmetic, by merely wiring the appropriate output of A gate to the appropriate input of an adjacent bit of the illustrates the set of partial products produced within the digital multiplier according to the present invention. Four of the partial products a, b, c, and d of Example 2 are essential to implement the Modified Booth Algorithm, discussed further hereinafter. The fifth partial product, e, is included in order to accomodate multiplication in either signed or unsigned binary numbers. If the Y-mode control indicates signed representation, then the fifth partial product (e) is not needed and it is made equal to zero. But, if the Y-mode control indicates unsigned representation, then the Modified Booth Algorithm requires a correction, which is implemented by adding the fifth partial product (e). This partial product is made equal to 256 times the multiplicand. In order to understand the justification for this conclusion, three cases need to be considered. Case number 1 is $Y_7=0$ in either the signed or unsigned representation. Case number 2 is $Y_7=1$ for the signed representation. This has the weight of $-128$. Case number 3 is $Y_7=1$ for the unsigned representation. Now, this has the weight of $+128$. The Booth's Algorithm has to be corrected for case number 3 by adding $+256$ to $-128$ to get $+128$ which is the correct interpretation for the unsigned representation.

| EXAMPLE 2: | | | | | | | $X_7$ | $X_6$ | $X_5$ | $X_4$ | $X_3$ | $X_2$ | $X_1$ | $X_0$ |
|---|---|---|---|---|---|---|---|---|---|---|---|---|---|---|
| | | | | | | | $Y_7$ | $Y_6$ | $Y_5$ | $Y_4$ | $Y_3$ | $Y_2$ | $Y_1$ | $Y_0$ |
| A | | | | | $a_9$ | $a_8$ | $a_7$ | $a_6$ | $a_5$ | $a_4$ | $a_3$ | $a_2$ | $a_1$ | $a_0$ |
| B | | | $b_9$ | $b_8$ | $b_7$ | $b_6$ | $b_5$ | $b_4$ | $b_3$ | $b_2$ | $b_1$ | $b_0$ | | |
| C | $c_9$ | $c_8$ | $c_7$ | $c_6$ | $c_5$ | $c_4$ | $c_3$ | $c_2$ | $c_1$ | $c_0$ | | | | |

-continued

| D | $d_9$ | $d_8$ | $d_7$ | $d_6$ | $d_5$ | $d_4$ | $d_3$ | $d_2$ | $d_1$ | $d_0$ | | | | | | |
|---|---|---|---|---|---|---|---|---|---|---|---|---|---|---|---|---|
| E | $e_7$ | $e_6$ | $e_5$ | $e_4$ | $e_3$ | $e_2$ | $e_1$ | $e_0$ | | | | | | | | |
| | $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |

The Modified Booth Algorithm digital multiplier 10 "looks at" combinations of sequential identical bits of the multiplier X as groups in order to obtain a particular partial product. According to the original Booth Algorithm, the encoding circuitry (including encoder circuit 18 and multiplexers 19-23 of FIG. 1) "skips over contiguous logical zeros" in the multiplier. If there is a group of contiguous logical "ones", according to the Booth Algorithm, the numerical value of a binary number consisting of a group of contiguous "ones" can be determined by subtracting the "weight" of the least significant bit of the string of contiguous "ones" from the "weight" of the next higher significant bit than the most significant bit of the string of contiguous ones.

In order to avoid the problem that different binary numbers having different numbers of groups of contiguous identical bits ("ones" or "zeros") would require different amounts of time to complete a multiplication, the Algorithm known as the Modified Booth algorithm is utilized wherein the circuitry "looks at" three bits of the multiplier X at a time and shifts two bits at a time. One bit of each three bit group is common to the end bit of one string and the beginning bit of another string, as indicated in FIG. 14. The following truth table discloses, in essence, the Modified Booth Algorithm.

| MODIFIED BOOTH ALGORITHM TRUTH TABLE | | | |
|---|---|---|---|
| $Y_{i+1}$ | $Y_i$ | $Y_{i-1}$ | i-th Partial Product |
| 0 | 0 | 0 | 0 |
| 0 | 0 | 1 | X |
| 0 | 1 | 0 | X |
| 0 | 1 | 1 | 2X |
| 1 | 0 | 0 | −2X |
| 1 | 0 | 1 | −X |
| 1 | 1 | 0 | −X |
| 1 | 1 | 1 | 0 |

In the above Modified Booth Algorithm truth table, Y is the multiplicand, and $Y_{i+1} Y_i Y_{i-1}$ is the "ith" three-bit group mentioned above. X is the multiplier, which according to the embodiment of the invention described herein, is an eight-bit binary number.

Those skilled in the art will understand the above table, and the derivation of the partial product column will not be explained herein. See the referenced Rubinfield article for a more complete explanation.

In order to implement the Modified Booth Algorithm, it is necessary that the multiplier word have an additional "dummy" bit, which is always assumed to be a "zero". FIG. 14 represents the eight positions of the multiplicand plus the dummy bit position $\phi$ and also indicates the relative "weights" signed to each of the binary bits of the multiplicand.

Each of the groups K, L, M, and N in FIG. 14 represent one of the overlapping three-bit groups referred to above, so that when the Modified Booth Algorithm is applied to encode illustrated word consisting of the multiplicand plus the dummy bit, the three multiplicand bits $Y_{i+1} Y_i Y_{i-1}$ refers to one of the four groups, K, L, M or N.

It can be seen that the group of FIG. 14 includes the $Y_1$ and $Y_0$ inputs to the Modified Booth encoder subsection 18a in FIG. 3, and also includes the dummy bit $\phi$.

Similarly, the bits of group M are the multiplier inputs to encoder subsection 18B in FIG. 6, the bits of group L are the multiplier inputs to subsection 18C, etc.

Referring to the multiplication in Example 2, above, it can be seen that the partial product generated by the Booth encoder circuit as it examines group M results in partial product a, while the result of encoding group N results in partial product b, and the result of examining (or operating on) group L results in partial product c, and the result of operation on group K results in partial product d.

Partial product e results from use of the $Y_M$ input in FIGS. 9 in conjunction with $Y_7$ in order to implement encoding of unsigned binary numbers.

Example 2 also indicates the proper alignment of each of the partial products a, b, c, d and e which is necessary prior to their addition by adder array 32 in order to obtain the desired 16-bit product $S_{0-15}$ which is designated by reference numeral 17.

Each of the Modified Booth Algorithm encoder subsections 18A-18E produces four control signals on four output conductors, respectively, indicated by reference numerals 28, 27, 26, 25, 24. The four control signals operate as inputs to one of the multiplexor are gated to the partial product outputs of the subject multiplexor. According to the modified Booth Truth Table, each three-bit binary group (K, L, M or N) is compared to the first three columns of the Modified Booth Truth Table to determine which of the four possibilities indicated in the right hand column of the truth table, that is, the (X) twice the multiplicand (2X), minus twice the multiplicand (−2X), minus the multiplicand (−X) or all zeros should be gated to the outputs of the subject multiplexor by the (23, 22, 21, 20, or 19) to produce the subject partial product a, b, c, d, or e, respectively. (The practical implementation of the multiplexors doesn't gate the "zeros" to the outputs, but simply produce "zeros" at the multiplexor outputs in this case.)

It is therefore seen that according to the invention, and also according to the approach of Example 2, it is necessary to produce only five partial products, a, b, c, d, and e in order to accomplish eight-by-eight multiplication with external control over the mode (signed or unsigned) of the multiplier and multiplicand. The convention multiplication approach as shown in Example 1 would require eight partial products.

The physical structure of one multiplexor bit, the $b_5$ list, is shown by 22B in FIG. 6. The (X) inputs to the multiplexor bit are achieved by double complementing of the multiplicand inputs. (See inverters D in FIG. 3, and the truth table of FIG. 13.) The (−X) inputs are obtained by single complementing—and adding "1" to the least significant bit. The (2X) inputs are obtained by shifting to the left by one bit, and the (−2X) imputs are obtained by single complementing, and adding "1" to the least significant bit as above.

BRIEF SUMMARY

In summary, the invention provides an improved digital multiplier capable of operating at higher speed with lower power dissipation than known similar digital multipliers. The digital multiplier according to the invention may be implemented on a single integrated circuit chip packaged in a known dual-in-line package and operated without requiring forced air cooling. Improved performance is obtained by utilizing an encoder to encode the multiplier input bits according to the Modified Booth Algorithm to produce a plurality of selection signals which in turn inputted to a plurality of multiplexer gating circuits. The multiplexer gating circuits permit the selection signals to produce a different partial product at the outputs of each of the multiplexer circuits, respectively. The number of partial products is substantially reduced over a number which would be produced if ordinary digital multiplication were implemented. Multiplexer gating circuits produce either zeros, the multiplicand, the negative of the multiplicand, twice the multiplicand, or the negative of twice the multiplicand, depending on which selection signals are produced by the encoder. The partial products are then added, utilizing an efficient adder which includes a plurality of carry-save adder stages and a final carry-look-ahead stage to produce the product outputs. Proper shifting or alignment of the partial products is accomplished by hard-wiring of the multiplexor outputs to the appropriate adder inputs.

While the invention has been particularly shown and described with reference to the preferred embodiments thereof, it will be understood to those skilled in the art that the foregoing and other changes in form and details may be made therein without departing from the spirit and scope of the invention.

What is claimed is:

1. A digital multiplier having a plurality of multiplier inputs and a plurality of multiplicand inputs comprising:
   first means responsive to three of said multiplier inputs for producing a selection signal representative of logic levels applied to said three multiplier inputs; and
   second means responsive to two adjacent ones of said multiplicand inputs and responsive to said selection signal for producing an output signal representative of one of said adjacent multiplicand inputs or the complement of one of said adjacent multiplicand inputs determined by said selection signal.

2. The digital multiplier as recited in claim 1 comprising a plurality of said second means each responsive to separate pairs of adjacent ones of said multiplicand inputs and to said selection signal for producing a plurality output signals, respectively, each representative of a one of said adjacent multiplicand inputs of said respective pair or the complements of one of said adjacent multiplicand inputs of said respective pair, determined by said selection signal, said plurality of outputs comprising a partial product of said multiplier inputs and said multiplicand inputs.

3. The digital multiplier as recited in claim 2 including:
   a plurality of said first means for producing a plurality of said selection signals, respectively, each of said first means being responsive to a separate group of three multiplier bits.

4. The digital multiplier as recited in claim 3 further comprising adder means having a plurality of adders for adding said partial products.

5. The digital multiplier as recited in claim 4 wherein successive ones of said partial products are inputted to successive alternate inputs said adder means in order to account for the arithmetic weight of each of said partial products.

6. The digital multiplier as recited in claim 5 implemented in a single semiconductor chip.

7. The digital multiplier as recited in claim 5 wherein said adder means includes an array of carry-save adders interconnected in a form similar to a Wallace Tree.

8. The digital multiplier as recited in claim 7 wherein said adder means includes a carry-look-ahead adder stage as a final stage.

9. The digital multiplier as recited in claim 5 further including a rounding input for receiving a rounding input signal, and rounding means responsive to said rounding input signal and coupled to said adder means for adding the number 1 to a predetermined bit of said adder means and truncating that bit and all less significant bits in response to said rounding input.

10. The digital multiplier as recited in claim 1 wherein said first means produces said selection signal according to the modified Booth Algorithm truth table, and said second means produces said output signal in accordance with said modified Booth Algorithm truth table.

11. The digital multiplier as recited in claim 1 further including a mode control input for receiving a mode control input signal, and mode control means for controlling whether said digital multiplier operates on a multiplier number applied to said multiplier inputs as an unsigned or signed number in response to said mode control signal.

12. The digital multiplier as recited in claim 1 further including a mode control input for receiving a mode control input signal, and mode control means responsive to said mode control signal for controlling whether said digital multiplier operates on a multiplicand number applied to said multiplicand inputs as a signed or unsigned number.

13. The digital multiplier as recited in claim 1 implemented in a single semiconductor chip.

14. The digital multiplier as recited in claim 1 wherein said second means includes a four-input OR-type gate having an output where said output signal is produced, and four two input gates each having an output coupled, respectively, to a separate one of said four inputs of said OR-type gate, each of said two-input gates implementing the Boolean equation $A \cdot \overline{B} = \overline{C}$, where A and B are the two input logic variables and C is the output variable.

15. The digital multiplier as recited in claim 14 wherein the A and B inputs of a first and second ones, respectively, of said two-input gates are coupled to one of said adjacent multiplicand inputs, and the A and B inputs of third and fourth ones, respectively, of said two-input gates are coupled to the other of said adjacent multiplicand inputs, the other inputs of said two-input gates being coupled to said first means.

16. The distal multiplexor as recited in claim 15 wherein each of said two-input gates requires no more than one transistor one input being coupled to the base of said transistor and the other input being coupled to the emitter of said transistor.

17. A digital multiplier having a plurality of inputs for receiving logic signals representative of a binary multiplier and a binary multiplicand, comprising:
   first means responsive to said multiplier inputs and to said multiplicand inputs for producing a plurality of partial products of said binary multiplier and said binary multiplicand;
   adder means coupled to said first means for adding said partial products to produce a plurality of product output signals; and mode input means for receiving a signal representative of whether said binary multiplier is signed or unsigned.

18. The digital multiplier as recited in claim 17 further including second mode input means for receiving a second signal representative of whether said binary multiplicand is signed or unsigned.

19. The digital multiplier as recited in claim 18 further including rounding input means for receiving a third signal for controlling rounding of said product output signals, said adder means adding the number 1 to a predetermined bit of said adder means in response to said third signal and truncating said predetermined bit and all bits of said adder means less significant than said predetermined bit.

20. The digital multiplier as recited in claim 17 implemented in a single integrated circuit chip.

21. The digital multiplier as recited in claim 17 wherein said first means effects implementation of the Modified Booth Algorithm.

* * * * *

UNITED STATES PATENT AND TRADEMARK OFFICE
CERTIFICATE OF CORRECTION

PATENT NO. : 4153938

DATED : May 8, 1979

INVENTOR(S) : Robert C. Ghest et al

It is certified that error appears in the above-identified patent and that said Letters Patent are hereby corrected as shown below:

Claim 16, line 1, delete "distal" and insert --digital--.

Signed and Sealed this

Fourth Day of September 1979

[SEAL]

Attest:

Attesting Officer

LUTRELLE F. PARKER

Acting Commissioner of Patents and Trademarks